(12) United States Patent
Zhang et al.

(10) Patent No.: US 12,284,614 B2
(45) Date of Patent: Apr. 22, 2025

(54) COMMUNICATION METHOD AND APPARATUS

(71) Applicant: Huawei Technologies Co., Ltd., Shenzhen (CN)

(72) Inventors: Xiangdong Zhang, Shenzhen (CN); Junren Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 793 days.

(21) Appl. No.: 17/171,826

(22) Filed: Feb. 9, 2021

(65) Prior Publication Data

US 2021/0168734 A1   Jun. 3, 2021

Related U.S. Application Data

(63) Continuation of application No. PCT/CN2019/100075, filed on Aug. 9, 2019.

(30) Foreign Application Priority Data

Aug. 10, 2018 (CN) .......................... 201810911035.9
Nov. 26, 2018 (CN) .......................... 201811415971.7

(51) Int. Cl.
*H04W 52/36* (2009.01)
*H04W 24/10* (2009.01)
*H04W 72/21* (2023.01)

(52) U.S. Cl.
CPC ......... *H04W 52/365* (2013.01); *H04W 24/10* (2013.01); *H04W 72/21* (2023.01)

(58) Field of Classification Search
CPC .... H04W 52/365; H04W 72/21; H04W 24/10
See application file for complete search history.

(56) References Cited

U.S. PATENT DOCUMENTS 11,665,650 B2 * 5/2023 Wang ................ H04L 5/0048
455/522
2013/0100925 A1 4/2013 Ahn et al.
(Continued)

FOREIGN PATENT DOCUMENTS

CN   102573032 A   7/2012
CN   102893679 A   1/2013
(Continued)

OTHER PUBLICATIONS

"3rd Generation Partnership Project; Technical Specification Group Radio Access Network; NR; Requirements for support of radio resource management(Release 15)," 3GPP Ts 38.133 V15.2.0, total 79 pages. 3rd Generation Partnership Project, Valbonne, France (Jun. 2018).

(Continued)

*Primary Examiner* — Michael Thier
*Assistant Examiner* — Nevena Zecevic Sandhu
(74) *Attorney, Agent, or Firm* — Leydig, Voit & Mayer, Ltd.

(57) ABSTRACT

This application provides a communication method and an apparatus. The communication method includes: after determining a first uplink data transmission moment and a first duration, determining, by a terminal device, a first moment based on the first uplink data transmission moment and the first duration, and monitoring a control channel based on the first moment. In this way, the terminal device may send a power headroom report (PHR) to a network device based on the control channel detected through monitoring at the first moment, so that efficiency of feeding back the PHR by the terminal device can be effectively improved.

15 Claims, 10 Drawing Sheets

(56) References Cited

U.S. PATENT DOCUMENTS

| | | | |
|---|---|---|---|
| 2016/0205681 A1 | 7/2016 | Kim et al. | |
| 2018/0049168 A1* | 2/2018 | Ryu | H04L 5/0094 |
| 2020/0245306 A1* | 7/2020 | Khude | H04W 72/23 |

FOREIGN PATENT DOCUMENTS

| | | |
|---|---|---|
| CN | 106162853 A | 11/2016 |
| CN | 107371229 A | 11/2017 |
| CN | 107682923 A | 2/2018 |
| WO | 2018058596 A1 | 4/2018 |
| WO | 2020008646 A1 | 1/2020 |

OTHER PUBLICATIONS

"3rd Generation Partnership Project; Technical Specification Group Radio Access Network; NR;Physical channels and modulation(Release 15)," 3GPP TS 38.211 V15.2.0, total 96 p. 3rd Generation Partnership Project, Valbonne, France (Jun. 2018).

"3rd Generation Partnership Project; Technical Specification Group Radio Access Network; NR;Physical layer procedures for control(Release 15)," 3GPP Ts 38.213 V15.2.0, total 99 p. 3rd Generation Partnership Project, Valbonne, France (Jun. 2018).

"3rd Generation Partnership Project; Technical Specification Group Radio Access Network; NR;Physical layer procedures for data (Release 15)," 3GPP TS 38.214 V15.2.0, total 95 pages, 3rd Generation Partnership Project, Valbonne, France (Jun. 2018).

"3rd Generation Partnership Project; Technical Specification Group Radio Access Network; NR;Medium Access Control (MAC) protocol specification(Release 15)," 3GPP TS 38.321 V15.2.0, total 73 pages, 3rd Generation Partnership Project, Valbonne, France (Jun. 2018).

Huawei, HiSilicon, "Further consideration on determination of the PH value type," 3GPP TSG-RAN WG2 Ad Hoc Meeting 1807, Montreal, Canada, R2-1809580, total 3 pages, 3rd Generation Partnership Project, Valbonne, France (Jul. 2-6, 2018).

Lenovo et al., "PHR for NR CA," 3GPP TSG-RAN WG2 #101, Athens, Greece, R2-1803111, Revision of R2-1800680, Total 3 pages, 3rd Generation Partnership Project, Valbonne, France (Feb. 26-Mar. 2, 2018).

"Remaining Issues on Power Control for NR CA," 3GPP TSG RAN WG1 Meeting #93, Busan, Korea, R1-1807373, Total 3 pages, 3rd Generation Partnership Project, Valbonne, France (May 21-25, 2018).

\* cited by examiner

COMMUNICATION METHOD AND APPARATUS

CROSS-REFERENCE TO RELATED APPLICATIONS

This application is a continuation of International Application No. PCT/CN2019/100075, filed on Aug. 9, 2019, which claims priority to Chinese Patent Application No. 201811415971.7, filed on Nov. 26, 2018, and Chinese Patent Application No. 201810911035.9, filed on Aug. 10, 2018, all of which are hereby incorporated by reference in their entireties.

TECHNICAL FIELD

The present disclosure relates to the field of wireless communications technologies, and in particular, to a communication method and an apparatus.

BACKGROUND

In an existing wireless communications system (for example, LTE), there is an uplink power control mechanism. A terminal device (user equipment, or UE) reports power headroom (PH) of the terminal device to a network device, and then, the network device determines subsequent uplink scheduling of the UE based on the PH reported by the UE. If the PH reported by the UE indicates that the UE has no power to support more uplink transmission, no more uplink resource can be allocated to the UE during subsequent scheduling. Otherwise, more uplink resources can be allocated to the UE, to improve an uplink transmission rate.

In the prior art, when calculating the PH that needs to be reported, the UE needs to consider a control channel for scheduling the first time of new uplink data transmission and a control channel before the control channel that are on CCs (component carriers) and that are after a power headroom report (PHR) event is triggered. Because a control channel and a data channel on different CCs of same UE may be not aligned and so on, after receiving, on a downlink control channel, an uplink grant for scheduling new uplink data transmission, how long the UE further needs to continue to monitor a control channel is a problem that needs to be resolved.

SUMMARY

Embodiments of this application provide a communication method and an apparatus, to determine a time for which a terminal device needs to monitor a control channel during PH calculation.

According to a first aspect, an embodiment of this application provides a communication method. The method includes: determining, by a terminal device, a first uplink data transmission moment and a first duration; determining, by the terminal device, a first moment based on the first uplink data transmission moment and the first duration, and monitoring a control channel based on the first moment; and sending, by the terminal device, a power headroom report PHR based on the monitored control channel.

The method may be performed by the terminal device. The terminal device may be a terminal device or a communications device or apparatus that can support a terminal device in implementing a function required by the foregoing method. For example, the terminal device may be a chip disposed in a terminal device.

In this embodiment of this application, after determining the first uplink data transmission moment and the first duration, the terminal device may determine the first moment based on the first uplink data transmission moment and the first duration, and monitor the control channel based on the first moment. In this way, the terminal device may send the PHR to a network device based on the control channel detected through monitoring at the first moment, so that efficiency of feeding back the PHR by the terminal device can be effectively improved.

In a possible design, the first uplink data transmission moment includes a transmission moment of the first time of uplink data transmission performed by the terminal device after the PHR is triggered; and the first moment is a moment earlier than the first uplink data transmission moment and a duration between the first moment and the first uplink data transmission moment is the first duration.

In a possible design, the determining, by a terminal device, a first uplink data transmission moment includes:

using a third moment as the first uplink data transmission moment if the terminal device does not detect a control channel through monitoring before a second moment after the terminal device detects a first control channel through monitoring, where a transmission moment of uplink data scheduled by using the control channel is before the third moment, the third moment is a transmission moment of uplink data scheduled by using the first control channel, and the second moment is a moment earlier than the third moment and a duration between the second moment and the third moment is the first duration.

In another possible design, the determining, by a terminal device, a first uplink data transmission moment further includes:

using a fourth moment as the first uplink data transmission moment if the terminal device detects a second control channel through monitoring before the second moment after the terminal device detects the first control channel through monitoring, where the fourth moment is a transmission moment of uplink data scheduled by using the second control channel, and the fourth moment is before the third moment.

In a possible design, after sending the PHR based on the monitored control channel, the terminal device may reserve a triggered PHR event. In this embodiment of this application, if the network device still sends, between the first moment and the first uplink data transmission moment, a control channel for scheduling an uplink resource for the terminal device, after the terminal device sends the PHR, the terminal device may reserve the triggered PHR event. In this way, when the terminal device detects a new control channel through monitoring after the first moment, the terminal device may transmit the PHR again by using the uplink resource scheduled by using the control channel, so that the network device can learn of a real and accurate power headroom status of the terminal device in time, and uplink resource allocation for the terminal device is more proper.

In a possible design, the PHR includes first indication information, and the first indication information is used to indicate whether the terminal device performs power borrowing.

According to a second aspect, an embodiment of this application provides another communication method. The method includes: determining, by a network device, a first uplink data transmission moment and a first duration; and skipping, by the network device, sending a third control channel in a range of the first duration before the first uplink data transmission moment.

The method may be performed by the network device. The network device may be a network device or a communications device or apparatus that can support a network device in implementing a function required by the foregoing method. For example, the network device may be a chip disposed in a network device.

In this way, because a terminal device does not consider, when calculating a PH value, a control channel sent by the network device between a first moment and the first uplink data transmission moment, if the network device does not send the third control channel in the range of the first duration before the first uplink data transmission moment, the network device and the terminal device cooperate with each other so that the PH value calculated by the terminal device is more accurate, and is more suitable for an actual data transmission status at the first uplink data transmission moment.

According to a third aspect, an embodiment of this application provides another communication method. The method includes: determining, by a network device, a first uplink data transmission moment and a first duration; and if the network device sends a third control channel to a terminal device in a range of the first duration before the first uplink data transmission moment, determining, by the network device, a type of PH based on a power headroom PH report sent by the terminal device.

The method may be performed by the network device. The network device may be a network device or a communications device or apparatus that can support a network device in implementing a function required by the foregoing method. For example, the network device may be a chip disposed in a network device.

In this embodiment of this application, if the terminal device indicates, by using the reported PHR, that a PH type on a CC is a virtual type, and the network device sends the third control channel on the CC in the range of the first duration before the first uplink data transmission moment, the network device may consider that the PH type that is on the CC and that is fed back by the terminal device is inaccurate, and may ignore the PH type that is on the CC and that is fed back by the terminal device, and determine that an actual PH type on the CC is a real type.

According to a fourth aspect, an embodiment of this application provides another terminal device. The terminal device has a function of implementing the terminal device in any one of the first aspect or the possible designs of the first aspect. The function may be implemented by hardware, or may be implemented by hardware executing corresponding software. The hardware or the software includes one or more modules corresponding to the function.

In a possible design, a structure of the terminal device includes a processing module and a transceiver module. The processing module is configured to support the terminal device in performing the corresponding function in any one of the first aspect or the designs of the first aspect. The transceiver module is configured to support communication between the terminal device and another communications device. The terminal device may further include a storage module. The storage module is coupled to the processing module. The storage module stores a program instruction and data that are necessary for the terminal device. In an example, the processing module may be a processor, the transceiver module may be a transceiver, and the storage module may be a memory.

According to a fifth aspect, an embodiment of this application provides a computer-readable storage medium. The computer storage medium stores a computer-readable instruction. When the computer-readable instruction is read and executed on a computer, the computer is enabled to perform the method in any one of the possible designs of the first aspect.

According to a sixth aspect, an embodiment of this application provides a computer program product. When the computer program product is read and executed on a computer, the computer is enabled to perform the method in any one of the possible designs of the first aspect.

According to a seventh aspect, an embodiment of this application provides a chip. The chip is connected to a memory, and is configured to read and execute a software program stored in the memory, to implement the method in any one of the possible designs of the first aspect.

According to an eighth aspect, an embodiment of this application provides a network device. The network device has a function of implementing the network device in any one of the second aspect or the possible designs of the second aspect. The function may be implemented by hardware, or may be implemented by hardware executing corresponding software. The hardware or the software includes one or more modules corresponding to the function.

In a possible design, a structure of the network device includes a processing module and a transceiver module. The processing module is configured to support the network device in performing the corresponding function in any one of the second aspect or the designs of the second aspect. The transceiver module is configured to support communication between the network device and another communications device. The network device may further include a storage module. The storage module is coupled to the processing module. The storage module stores a program instruction and data that are necessary for the network device. In an example, the processing module may be a processor, the transceiver module may be a transceiver, and the storage module may be a memory.

According to a ninth aspect, an embodiment of this application provides a computer-readable storage medium. The computer storage medium stores a computer-readable instruction. When the computer-readable instruction is read and executed on a computer, the computer is enabled to perform the method in any one of the possible designs of the second aspect.

According to a tenth aspect, an embodiment of this application provides a computer program product. When the computer program product is read and executed on a computer, the computer is enabled to perform the method in any one of the possible designs of the second aspect.

According to an eleventh aspect, an embodiment of this application provides a chip. The chip is connected to a memory, and is configured to read and execute a software program stored in the memory, to implement the method in any one of the possible designs of the second aspect.

According to a twelfth aspect, an embodiment of this application provides another network device. The network device has a function of implementing the network device in any one of the third aspect or the possible designs of the third aspect. The function may be implemented by hardware, or may be implemented by hardware executing corresponding software. The hardware or the software includes one or more modules corresponding to the function.

In a possible design, a structure of the network device includes a processing module and a transceiver module. The processing module is configured to support the network device in performing the corresponding function in any one of the third aspect or the designs of the third aspect. The transceiver module is configured to support communication between the network device and another communications device. The network device may further include a storage module. The storage module is coupled to the processing module. The storage module stores a program instruction and data that are necessary for the network device. In an example, the processing module may be a processor, the transceiver module may be a transceiver, and the storage module may be a memory.

According to a thirteenth aspect, an embodiment of this application provides a computer-readable storage medium. The computer storage medium stores a computer-readable instruction. When the computer-readable instruction is read and executed on a computer, the computer is enabled to perform the method in any one of the possible designs of the third aspect.

According to a fourteenth aspect, an embodiment of this application provides a computer program product. When the computer program product is read and executed on a computer, the computer is enabled to perform the method in any one of the possible designs of the third aspect.

According to a fifteenth aspect, an embodiment of this application provides a chip. The chip is connected to a memory, and is configured to read and execute a software program stored in the memory, to implement the method in any one of the possible designs of the third aspect.

According to a sixteenth aspect, an embodiment of this application provides a communications system. The system includes a terminal device and a network device. The terminal device may be configured to perform the method in any one of the first aspect or the possible designs of the first aspect. The network device may be configured to perform the method in any one of the second aspect or the possible designs of the second aspect, or may be configured to perform the method in any one of the third aspect or the possible designs of the third aspect.

DESCRIPTION OF EMBODIMENTS

Figure 1A:
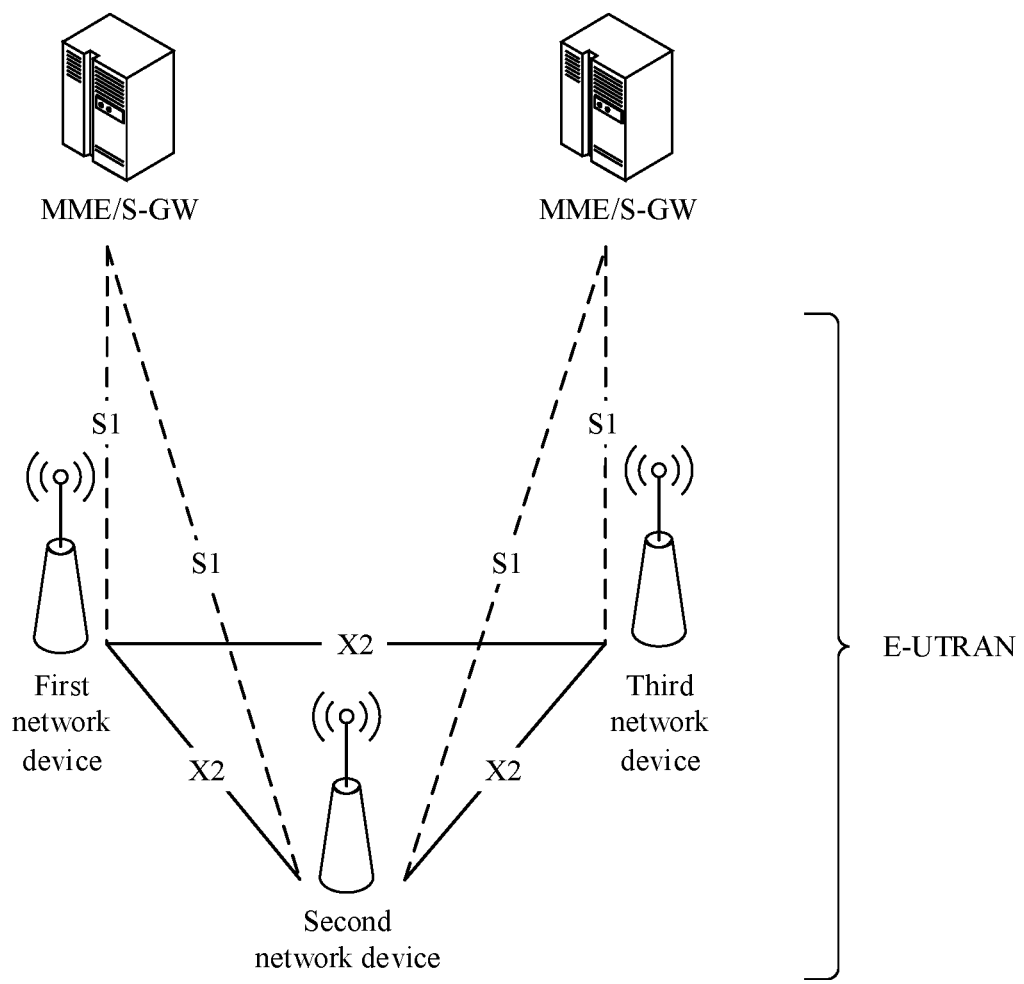
FIG. 1A and FIG. 1B each are a schematic diagram of an application scenario to which an embodiment of this application is applicable.

To make the objectives, technical solutions, and advantages of this application clearer, the following describes embodiments of this application in detail with reference to the accompanying drawings in this specification. It should be noted that the terms used in implementations of this application are merely used to explain specific embodiments of this application, but are not intended to limit this application.

In the following, some terms of the embodiments of this application are explained and described, to help a person skilled in the art have a better understanding.

(1) A terminal device includes a device that provides a user with voice and/or data connectivity, and for example, may include a handheld device with a wireless connection function or a processing device connected to a wireless modem. The terminal device may communicate with a core network through a radio access network (RAN), and exchange a voice and/or data with the RAN. The terminal device may include a user equipment (UE), a wireless terminal device, a mobile terminal device, a subscriber unit, a subscriber station, a mobile station, a mobile station (mobile), a remote station, an access point (AP), a remote terminal device, an access terminal device (access terminal), a user terminal device (user terminal), a user agent, a user device, or the like. For example, the terminal device may include a mobile phone (which is also referred to as a "cellular" phone), a computer having a mobile terminal device, a portable, pocket-sized, handheld, computer built-in, or vehicle-mounted mobile apparatus, and a smart wearable device. For example, the terminal device may include a device such as a personal communications service (PCS) phone, a cordless telephone set, a session initiation protocol (SIP) phone, a wireless local loop (WLL) station, or a personal digital assistant (PDA). The terminal device further includes a limited device such as a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example rather than limitation, in the embodiments of this application, the terminal device may alternatively be a wearable device. The wearable device may also be referred to as a wearable intelligent device, and is a generic name of wearable devices developed by intelligently designing daily wear by using a wearable technology, for example, glasses, gloves, a watch, clothing, and shoes. The wearable device is a portable device that can be directly worn on a body or integrated into clothes or an accessory of a user. The wearable device is not only a hardware device, but is used to implement a powerful function through software support, data exchange, and cloud interaction. In a broader sense, the wearable intelligent device is full-featured, has a large size, and can implement all or some functions without depending on a smartphone. For example, the wearable intelligent device is a smart watch or smart glasses. Alternatively, the wearable intelligent device focuses only on a specific application function and needs to be used with another device such as a smartphone. For example, the wearable intelligent device is a smart wristband, a smart helmet, or smart jewelry for physical sign monitoring.

(2) A network device, for example, including a base station (for example, an access point), may be a device that is in an access network and that communicates with a wireless terminal device over an air interface in one or more cells. The network device may be configured to: mutually convert a received over-the-air frame and an internetwork protocol (IP) packet and serve as a router between the terminal device and a rest portion of the access network, where the rest portion of the access network may include an IP network. The network device may further coordinate attribute management of the air interface. For example, the network device may include an evolved NodeB (eNB, or e-NodeB, or evolutional Node B) in a long term evolution (LTE) system or an LTE-advanced (LTE-A) system, may include a next generation NodeB (gNB) in a 5th generation (5G) new radio (NR) system, or may include a centralized unit (CU) and a distributed unit (DU) in a cloud access network (CloudRAN) system. This is not limited in the embodiments of this application.

It should be understood that, in the following description, words such as "first" and "second" are merely used for distinction and description, and shall not be understood as an indication or implication of relative importance or an indication or implication of an order.

It should be understood that, the technical solutions in the embodiments of this application may be used in various communications systems such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS) system, a worldwide interoperability for microwave access (WiMAX) communications system, and a future 5G communications system.

Further, the embodiments of this application may be further used in an evolved universal mobile telecommunications system terrestrial radio access network (E-UTRAN) system or a next generation (NG)-RAN system, or may be used in a next generation communications system or a similar communications system.

FIG. 1A shows an application scenario according to an embodiment of this application or a network architecture used in an embodiment of this application. The network architecture may be a network architecture of an E-UTRAN system. In FIG. 1A, an E-UTRAN includes eNBs, and provides E-UTRA user plane and control plane protocols towards a terminal device. The eNBs are interconnected through X2 interfaces. The eNBs are also connected to mobility management entities (MME) through S1-MME interfaces, and are connected to serving gateways (S-GW) through S1-U interfaces. In FIG. 1A, three eNBs are used as an example, and the eNBs are represented as network devices in FIG. 1A, and are respectively a first network device, a second network device, and a third network device.

No terminal device is shown in FIG. 1A. Actually, each eNB in FIG. 1A may serve one or more terminal devices. A technical solution provided in this embodiment of this application may be performed by the terminal device and the eNB serving the terminal device.

Figure 1B:
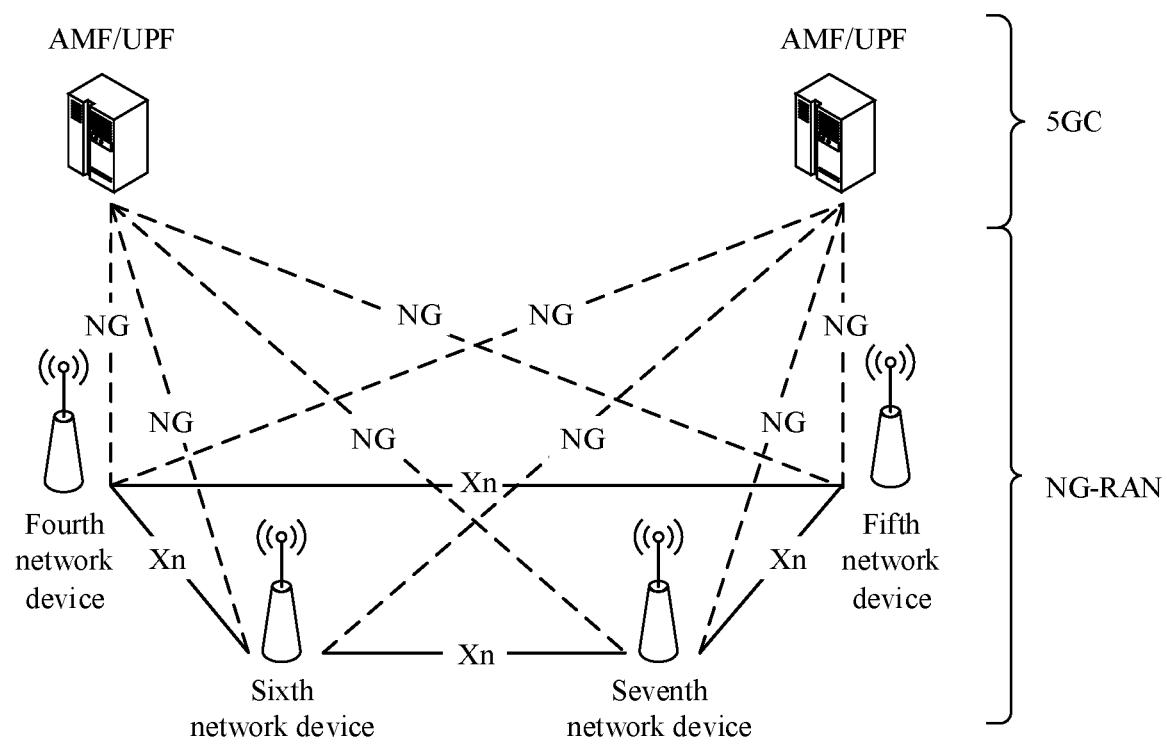

FIG. 1B shows another application scenario according to an embodiment of this application or another network architecture used in an embodiment of this application. The network architecture may be a network architecture of an NG-RAN system. In FIG. 1B, gNBs provide NR user plane and control plane protocols towards a terminal device, and the gNBs are connected to a core network of a 5G system; and ng-eNBs provide an E-UTRA user plane and control plane protocols towards the terminal device, and the ng-eNBs are also connected to the core network of the 5G system. The gNBs are connected to the ng-eNBs through Xn interfaces, and both the gNBs and the ng-eNBs are connected to access and mobility management functions (access and AMF)/user plane functions (UPF) (AMF/UPF) in the 5G core network (5GC) through NG interfaces. In FIG. 1B, both a fourth network device and a fifth network device are gNBs, and both a sixth network device and a seventh network device are ng-eNBs. No terminal device is shown in FIG. 1B either. Actually, each gNB or ng-eNB in FIG. 1B may serve one or more terminal devices. A technical solution provided in this embodiment of this application may be performed by the terminal device and the gNB serving the terminal device, or may be performed by the terminal device and the ng-eNB serving the terminal device.

Figure 2:
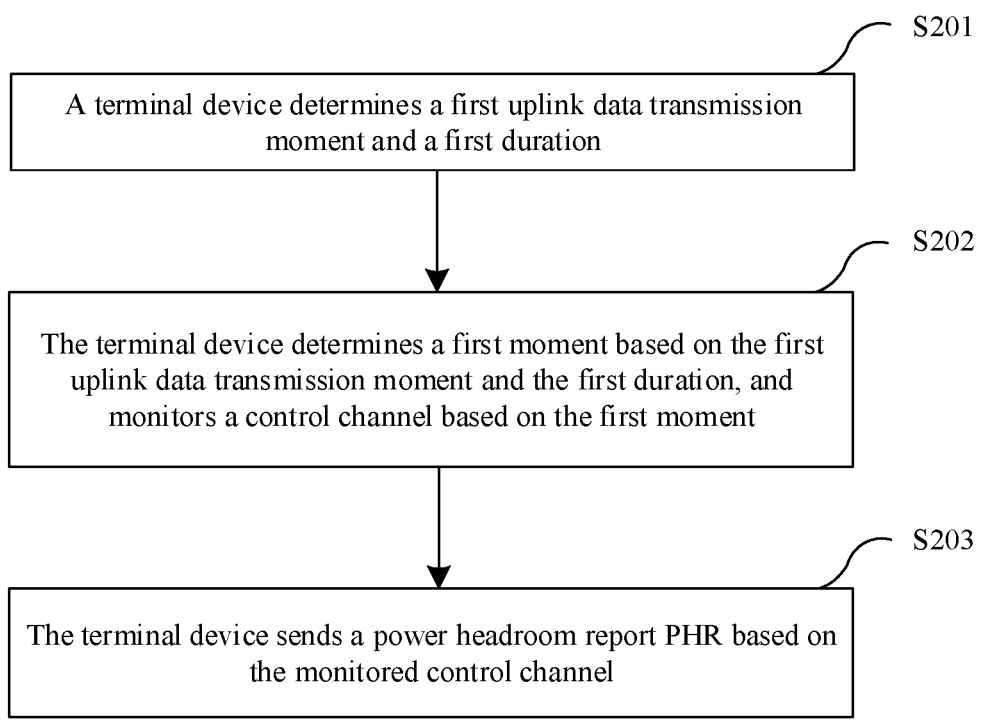
FIG. 2 is a schematic flowchart corresponding to a communication method according to an embodiment of this application.

Based on the foregoing network structures, FIG. 2 is a schematic flowchart of a communication method according to an embodiment of this application. Referring to FIG. 2, the method includes the following steps.

Step S201: A terminal device determines a first uplink data transmission moment and a first duration.

Step S202: The terminal device determines a first moment based on the first uplink data transmission moment and the first duration, and monitors a control channel based on the first moment.

Step S203: The terminal device sends a power headroom report PHR based on the monitored control channel.

It can be learned that in this embodiment of this application, after determining the first uplink data transmission moment and the first duration, the terminal device may determine the first moment based on the first uplink data transmission moment and the first duration, and monitor the control channel based on the first moment. In this way, the terminal device may send the PHR to a network device based on the control channel detected through monitoring at the first moment, so that efficiency of feeding back the PHR by the terminal device can be effectively improved.

In specific implementation of step S201, the first uplink data transmission moment may be a transmission moment of the first time of uplink data transmission performed by the terminal device after the PHR is triggered. In a possible design, the first uplink data transmission moment may be specifically a transmission moment of the first time of new uplink data transmission (namely, new data transmission different from data retransmission) performed by the terminal device after the PHR is triggered. After determining the first uplink data transmission moment, the terminal device may send the PHR to the network device at the first uplink data transmission moment.

The first duration may be a duration parameter value determined according to a preset rule or configured by the network device in a manner such as signaling interworking. In a possible design, the first duration may be an absolute time, for example, 0.5 ms or 1 μs. In another possible design, the first duration may be a data symbol quantity such as a length of one or more orthogonal frequency division multiplexing (OFDM) symbols or slots. It should be noted that, even if a first duration has a same absolute time, data symbol quantities corresponding to different subcarrier spacings (SCS) may be different. This is not specifically limited in this embodiment of this application. Specifically, in this embodiment of this application, the first duration may be a specified parameter value that has been specified in a communications protocol and that is stored in the terminal device. The terminal device may obtain the first duration from local storage. Alternatively, if the first duration may be configured by the network device, the network device may further configure the parameter value based on subcarrier spacings of carriers of the terminal device, and further send the parameter value to the terminal device. This is not specifically limited in this embodiment of this application either.

In a possible embodiment, the subcarrier spacing corresponds to a second duration. Further, different subcarrier spacings may correspond to different second durations. In this case, the first duration may be a longest duration in a plurality of second durations. The longest duration may also be referred to as a largest duration. That is, a duration length of the first duration is largest. Optionally, the first duration may be a shortest duration in a plurality of second durations. The shortest duration may also be referred to as a smallest duration. That is, a duration length of the first duration is smallest. Such a duration setting manner can be used to reduce complexity of the terminal because a calculation amount of the terminal is less. Further, power consumption may be further reduced.

A corresponding network side may also use a same or similar method, and details are not described again. Further, the terminal device and the network device in all of the following embodiments may use a similar setting manner.

In this embodiment of this application, the network device may indicate, to the terminal device by delivering the control channel, information about an uplink resource allocated to the terminal device. The information about the uplink resource may be specifically uplink grant (UL grant) information. Therefore, the terminal device may obtain, by monitoring the control channel, the uplink resource allocated by the network device to the terminal device, and determine the first uplink data transmission moment based on the control channel detected through monitoring after the PHR is triggered. It should be noted that this embodiment of this application is described by using an example in which the terminal device continuously monitors the control channel. In an actual application scenario, a terminal device in connected mode may monitor the control channel based on a configuration of the network device. For example, the terminal device in connected mode may monitor the control channel based on a connected mode discontinuous reception (DRX) configuration. A terminal device in a DRX sleep state may not monitor the control channel, and a terminal device in a DRX active state continuously monitors the control channel.

Specifically, in this embodiment of this application, the terminal device may determine the first uplink data transmission moment in the following manner.

The terminal device may detect a first control channel through monitoring at a moment that is after the PHR is triggered. The first control channel may be a control channel delivered by the network device and used to schedule new data transmission (namely, new data transmission) for the terminal device. This may be understood as that an uplink resource allocated by the network device to the terminal device by using the first control channel is used to transmit new uplink data of the terminal device, but is not used to transmit uplink data that has been sent by the terminal device to the network device before but is not successfully received by the network device and that needs to be retransmitted.

That the first control channel is used to schedule an uplink resource at a third moment for the terminal is used as an example. The terminal device may use the third moment as the first uplink data transmission moment if the terminal device does not detect a control channel through monitoring before a second moment after the terminal device detects the first control channel through monitoring, where a transmission moment of uplink data scheduled by using the control channel is before the third moment. The second moment is a moment earlier than the third moment and a duration between the second moment and the third moment is the first duration. In other words, because the terminal device needs to send the PHR to the network device at the third moment (namely, a transmission moment of uplink data scheduled by using the first control channel), to reserve a processing time for the terminal device to calculate a PH value, a deadline needs to be set before the third moment, and the terminal device only needs to calculate the PH value based on a control channel detected through monitoring before the deadline and send the PHR to the network device, without considering a control channel detected through monitoring after the deadline. In this example, if the terminal device does not detect the control channel through monitoring before the second moment, the deadline is the second moment, and the second moment is a moment obtained by subtracting the first duration from the third moment, where the transmission moment of the uplink data scheduled by using the control channel is before the third moment.

If the terminal device detects a second control channel through monitoring before a second moment after detecting the first control channel through monitoring, where the second control channel is another control channel that is delivered by the network device and that is used to schedule new data transmission for the terminal device, and a transmission moment of uplink data scheduled by using the second control channel is denoted as a fourth moment, when the fourth moment is before the third moment (that is, the fourth moment is earlier than the third moment), the terminal device may use the fourth moment as the first uplink data transmission moment. On the contrary, if the fourth moment is after the third moment (that is, the fourth moment is later than the third moment), the terminal device may ignore the fourth moment that is the transmission moment of the uplink data scheduled by using the second control channel, and still use the third moment as the first uplink data transmission moment.

In this embodiment of this application, alternatively, the first control channel may be specifically the NO.1 control channel that is detected by the terminal device through monitoring after the PHR is triggered and that is used to schedule new data transmission. In this way, it can be learned that in this embodiment of this application, a process in which the terminal device determines the first uplink data transmission moment is essentially a process of searching, in a cyclic iterative manner, for the transmission moment of the first time of the new uplink data transmission performed by the terminal device.

Figure 3:
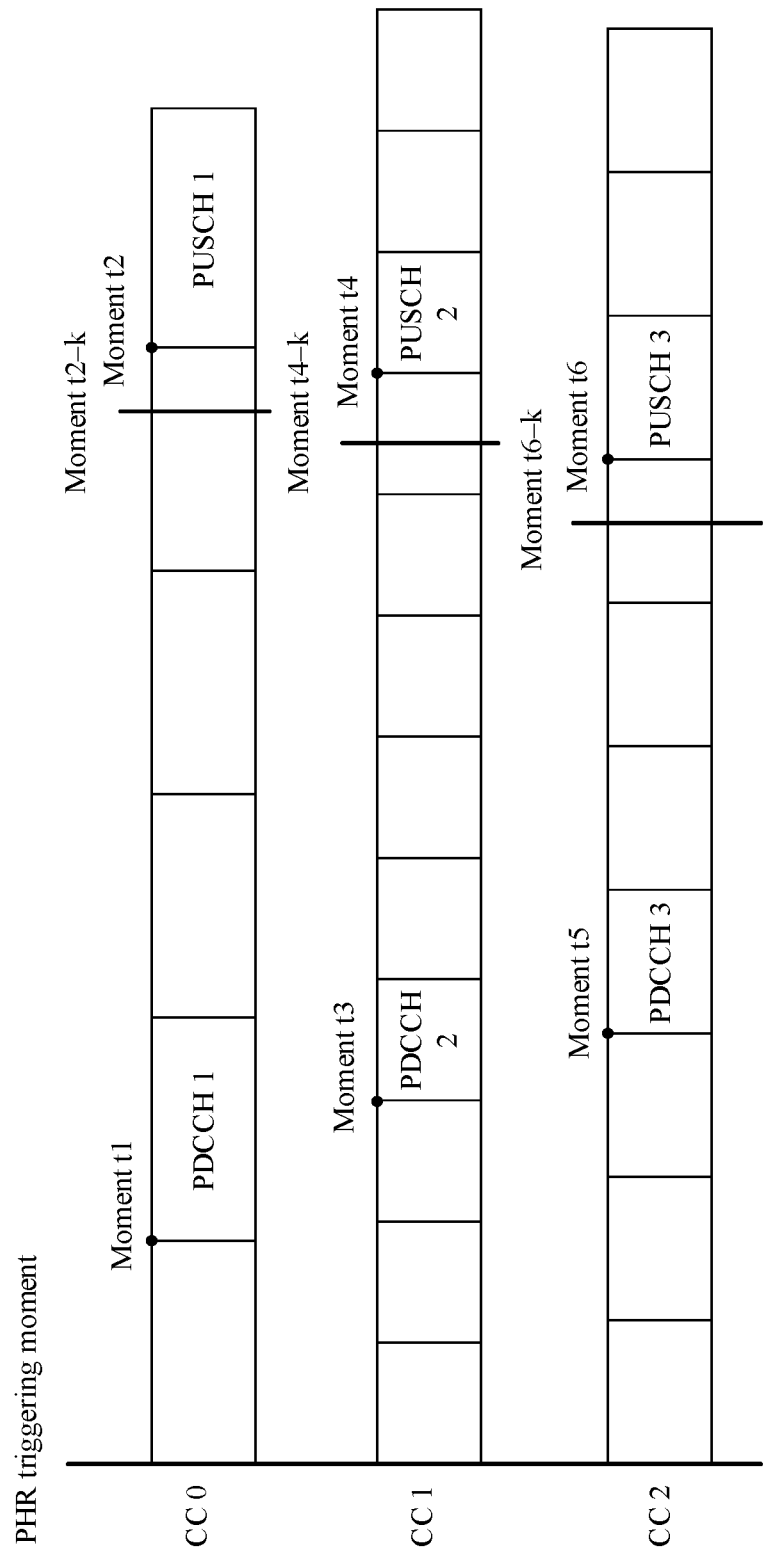
FIG. 3 is a schematic diagram of monitoring a control channel by a terminal device according to an embodiment of this application.

For example, a control channel sent by the network device is a physical downlink control channel (PDCCH), and a corresponding data channel that is scheduled is a physical uplink shared channel (PUSCH). As shown in FIG. 3, the terminal device has three component carriers: a CC 0, a CC 1, and a CC 2. A PDCCH 1 on the CC 0 at a moment t1 is the NO.1 control channel that is detected by the terminal device through monitoring after the PHR is triggered and that is used to schedule new data transmission, and a PUSCH 1 at a moment t2 is scheduled by using the PDCCH 1 to transmit uplink data. Therefore, when detecting the PDCCH 1 through monitoring, the terminal device may use the moment t2 as an initial first uplink data transmission moment, and then continue to monitor a control channel in a time range from the moment t1 to a moment t2−k. Herein, k refers to the first duration.

If the terminal device detects no other PDCCH through monitoring in the time range from the moment t1 to the moment t2−k, the terminal device may use the moment t2 as a final first uplink data transmission moment, calculate the PH value based on a control channel detected through monitoring after the PHR is triggered and until the moment t2−k, and send the PHR to the network device on the PUSCH 1 at the moment t2.

If the terminal device detects a PDCCH 2 through monitoring at a moment t3 in the time range from the moment t1 to the moment t2−k, a PUSCH 2 at a moment t4 is scheduled by using the PDCCH 2, and the moment t4 is before the moment t2, the terminal device may update the first uplink data transmission moment from the initial moment t2 to the latest moment t4. That is, it is considered that the current moment t4 is the transmission moment of the first time of the new uplink data transmission performed by the terminal device after the PHR is triggered.

Further, the terminal device may continue to monitor a control channel in a time range from the moment t3 to a moment t4−k. If no other PDCCH is detected through monitoring until the moment t4−k, the moment t4 may be determined as the final first uplink data transmission moment; otherwise, if a PDCCH 3 is detected through monitoring at a moment t5 before the moment t4−k, a PUSCH 3 at a moment t6 is scheduled by using the PDCCH 3, and the moment t6 is before the moment t4, the terminal device may update the first uplink data transmission moment from the previous moment t4 to the latest moment t6. That is, it is considered that the current moment t6 is the transmission moment of the first time of the new uplink data transmission performed by the terminal device after the PHR is triggered.

Figure 4:
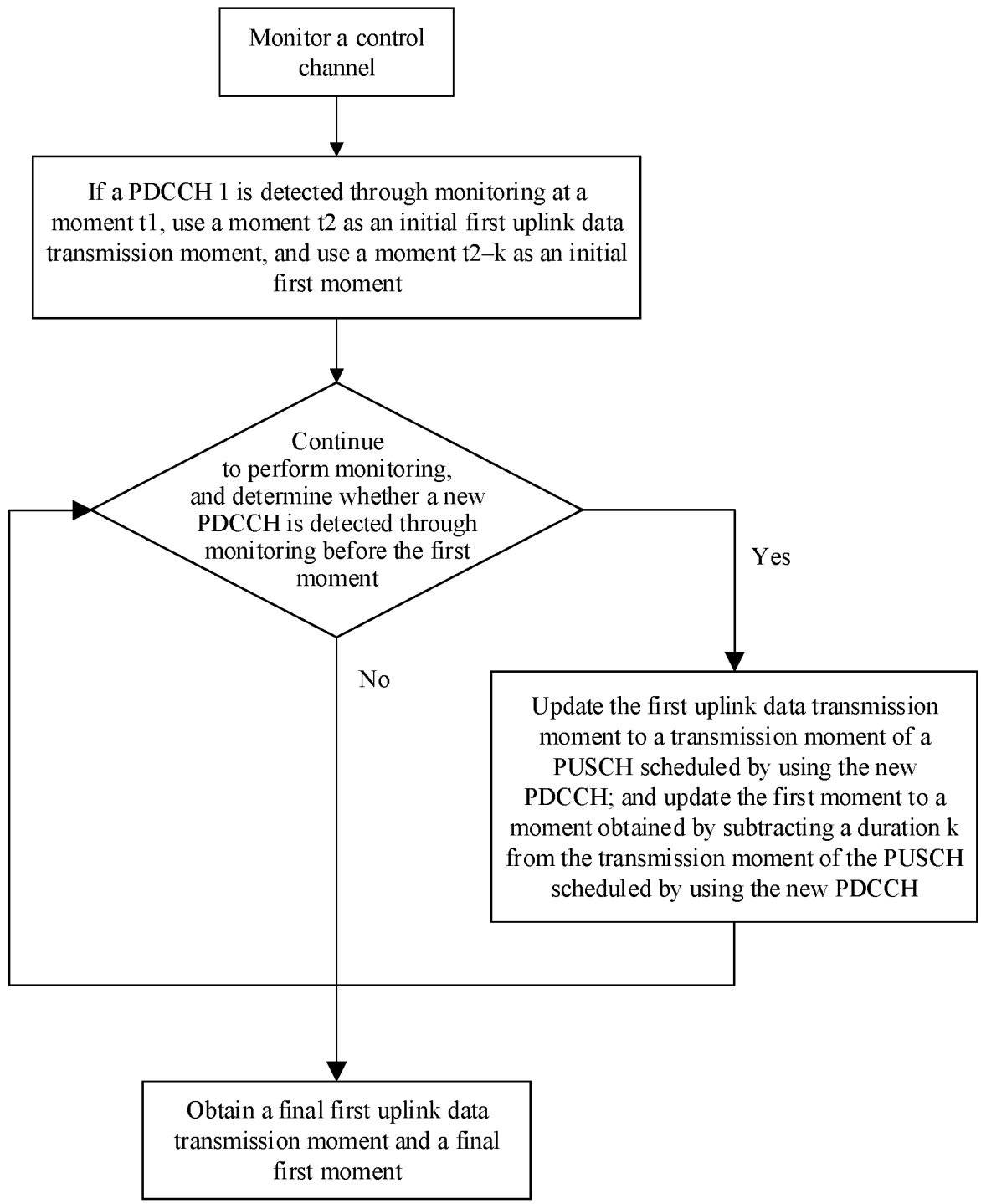
FIG. 4 is a flowchart of a procedure for determining a first uplink data transmission moment by a terminal device according to an embodiment of this application.

By analogy, as shown in a flowchart of a procedure in FIG. 4, the terminal device may continue to monitor a control channel. Each time a PDCCH is detected through monitoring, where a moment of a PUSCH scheduled by using the PDCCH is before a currently latest first uplink data transmission moment, the foregoing steps are repeatedly performed to update the first uplink data transmission moment, and then the terminal device continues to perform monitoring until a moment, where the moment is earlier than a latest first uplink data transmission moment and a duration between the moment and the latest first uplink data transmission moment is the duration k.

It should be noted that although not shown, subcarrier spacings of the three component carriers shown in FIG. 3 may be different. In an actual application scenario, in a plurality of component carriers included in a terminal, subcarrier spacings of some carriers may be the same or different. This is not specifically limited in this embodiment of this application.

In specific implementation of step S202, the terminal device may determine the first moment based on the first uplink data transmission moment and the first duration, where the first moment is a moment earlier than the first uplink data transmission moment and a duration between the first moment and the first uplink data transmission moment is the first duration.

Specifically, if the terminal device does not detect the control channel through monitoring before the second moment after the terminal device detects the first control channel through monitoring, where the transmission moment of the uplink data scheduled by using the control channel is before the third moment, the first moment is a moment earlier than the third moment and a duration between the first moment and the third moment is the first duration. If the terminal device detects the second control channel through monitoring before the second moment after detecting the first control channel through monitoring, and the transmission moment (namely, the fourth moment) of the uplink data scheduled by using the second control channel is earlier than the third moment, the first moment is a moment earlier than the fourth moment and a duration between the first moment and the fourth moment is the first duration.

For another example, in the example shown in FIG. 3, if the terminal device detects only the PDCCH 1 through monitoring, the first moment is the moment t2−k. If the terminal device detects the PDCCH 1 and the PDCCH 2 through monitoring, the first moment is the moment t4−k. If the terminal device detects the PDCCH 1, the PDCCH 2, and the PDCCH 3 through monitoring, the first moment is a moment t6−k. It should be noted that, in an actual monitoring process of the terminal device, the first moment is synchronously updated with the latest first uplink data transmission moment. In other words, after detecting the PDCCH 1 through monitoring, the terminal device may use the moment t2−k as an initial first moment. If no other control channel is detected subsequently, where a transmission moment of uplink data scheduled by using the control channel is before the moment t2, the moment t2−k may be used as a final first moment. When the terminal device detects, through monitoring, the PDCCH 2 that is used to schedule uplink data at the moment t4, the terminal device may update the first uplink data transmission moment to the moment t4, and update the first moment from the previous moment t2−k to the moment t4−k. When a PDCCH that is used to schedule a PUSCH earlier than the moment t4 is subsequently detected through monitoring, the first uplink data transmission time and the first moment are updated according to a same method until a latest first moment.

In specific implementation of step S203, the terminal device may calculate the PH value based on a control channel detected through monitoring before the first moment, and send the PHR to the network device at the first uplink data transmission moment. More specifically, the terminal device may calculate the PH value based on a control channel detected through monitoring between the moment at which the PHR is triggered and the first moment, and send the PHR to the network device at the first uplink data transmission moment. That the terminal device calculates the PH value specifically means that the terminal device calculates the power headroom based on a power required for transmitting all data on carriers at the first uplink data transmission moment. In addition, the data transmission performed at the first uplink data transmission moment may include any one or more of new data transmission or data retransmission that is scheduled by the network device or data transmission semi-statically configured by the network device. This is not specifically limited in this embodiment of this application.

Specifically, when the terminal device calculates the PH value, if before the first moment, a control channel is detected through monitoring on a component carrier CC, a PH type, in the PHR, corresponding to the CC is real, and correspondingly, a calculation formula corresponding to the real type may be used for a method for calculating a PH on the CC; otherwise, if no control channel is detected through monitoring on a CC, a PH type, in the PHR, corresponding to the CC is virtual, and correspondingly, a calculation formula corresponding to the virtual type may be used for a method for calculating a PH on the CC.

Herein, the two PH types, namely, the real type and the virtual type, in this embodiment of this application need to be described. A real-type PH means that there is actual data transmission on a CC, the data transmission may include any one or more of new data transmission, repeat transmission of previous data, or semi-statically configured data transmission, and the terminal device calculates the power headroom based on the actual data transmission. A virtual-type PH means that there is no actual data transmission on a CC, and the terminal device calculates the power headroom based on a reference format. It can be learned that, compared with the virtual-type power headroom, the real-type power headroom calculated based on the actual transmission is more valuable to the network device. The network device may more accurately schedule an uplink resource based on the real-type power headroom, thereby improving uplink resource utilization.

It should be noted that, in this embodiment of this application, the first moment is a time point used to define control channels that are detected by the terminal device through monitoring and based on which the terminal device calculates the PH value. To send, after the PHR is triggered, the PHR report by using an uplink resource scheduled by the network device and used for the first time of new uplink data transmission, the terminal device needs to pack the to-be-sent PHR before the first uplink data transmission moment. The first moment refers to a time point at which the terminal device starts to calculate the PH value and perform data processing based on a control channel previously detected through monitoring. After the first moment, the network device may continue to send a control channel. An uplink resource scheduled by using the newly sent control channel may be before or after the first uplink data transmission moment. However, to reserve a time for the terminal device to calculate and process the PH value, when the terminal device calculates the PH value, the control channel is no longer considered.

In this embodiment of this application, the terminal device includes one or more PHR events. The PHR events may be triggered when a preset triggering condition is met, or may be triggered at a preset time point. In this embodiment of this application, "the PHR is triggered" means that a PHR event of the terminal device is triggered. After a PHR is triggered, the method procedure of determining the first uplink data transmission moment and sending the PHR in step S201 to step S203 in this embodiment of this application is triggered.

Further, after sending the PHR, the terminal device may delete the triggered PHR event, or may reserve the triggered PHR event. It can be learned that if the network device still sends, between the first moment and the first uplink data transmission moment, a control channel for scheduling an uplink resource for the terminal device, after the terminal device sends the PHR, the terminal device may reserve the triggered PHR event. In this way, when the terminal device detects a new control channel through monitoring after the first moment, the terminal device may transmit the PHR again by using the uplink resource scheduled by using the control channel, so that the network device can learn of a real and accurate power headroom status of the terminal device in time, and uplink resource scheduling and allocation for the terminal device are more proper.

In addition, the PHR sent by the terminal device may further include first indication information used to indicate whether the terminal device performs power borrowing.

Figure 5:
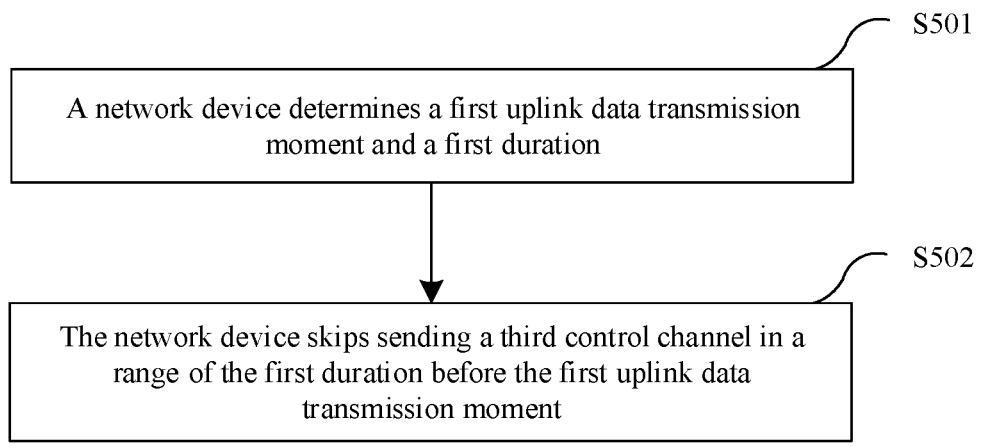
FIG. 5 is a schematic flowchart corresponding to another communication method according to an embodiment of this application.

Based on a same inventive concept, an embodiment of this application further provides another communication method used on a network device side, so that a PHR sent by a terminal device better conforms to an actual transmission status of the terminal device. Referring to FIG. 5, the method includes the following steps.

Step S501: A network device determines a first uplink data transmission moment and a first duration.

Step S502: The network device skips sending a third control channel in a range of the first duration before the first uplink data transmission moment.

In this embodiment of this application, if the network device has learned of a PHR triggering moment of the terminal device, the network device may determine the first uplink data transmission moment based on the PHR triggering moment and each control channel sent by the network device to the terminal. The first uplink data transmission moment is a transmission moment of the first time of uplink data transmission scheduled by the network device for the terminal device. More specifically, the first uplink data transmission moment may alternatively be a transmission moment of the first time of new uplink data transmission scheduled by the network device for the terminal device.

The first duration is the same as a first duration of the terminal device. The first duration may be a specified parameter value determined according to a preset rule (for example, a communications protocol), or may be a parameter value configured by the network device and is locally stored and then sent to the terminal device. This is not limited in this embodiment of this application.

In specific implementation of step S502, after determining the first uplink data transmission moment and the first duration, the network device may skip sending the third control channel in the range of the first duration before the first uplink data transmission moment. In a possible design, skipping sending the third control channel may mean not sending the third control channel. A transmission moment of uplink data scheduled by using the third control channel may be before or after the first uplink data transmission moment. This is not specifically limited in this embodiment of this application. In this way, because the terminal device does not consider, when calculating a PH value, a control channel sent by the network device between a first moment and the first uplink data transmission moment, if the network device does not send the third control channel in the range of the first duration before the first uplink data transmission moment, the network device and the terminal device cooperate with each other so that the PH value calculated by the terminal device is more accurate, and is more suitable for an actual data transmission status at the first uplink data transmission moment.

For example, with reference to FIG. 3, if the terminal device detects the PDCCH 1, the PDCCH 2, and the PDCCH 3 through monitoring, that the network device does not send the third control channel in this embodiment of this application specifically means that the network device does not send a PDCCH 4 between the moment t6−k and the moment t6, where an uplink resource scheduled by using the PDCCH 4 is before the moment t6.

Figure 6:
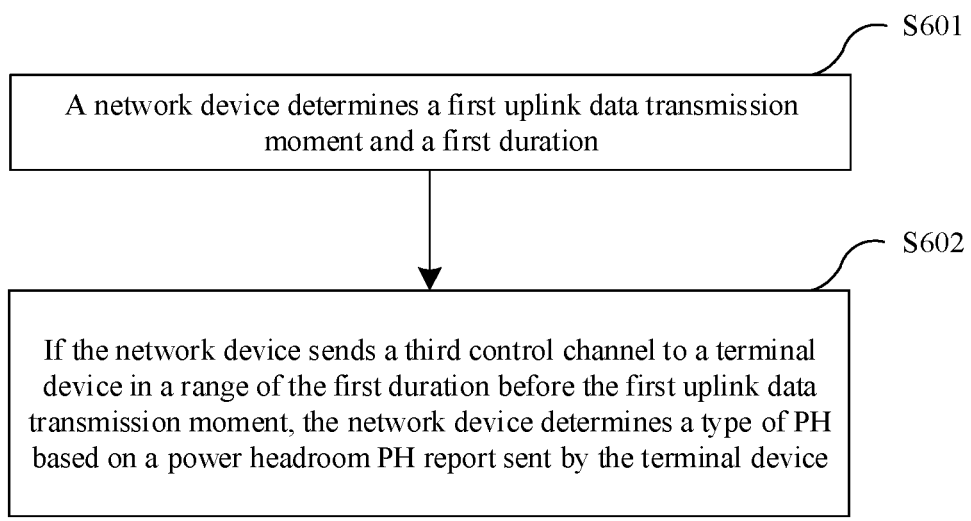
FIG. 6 is a schematic flowchart corresponding to another communication method according to an embodiment of this application.

Based on the same inventive concept, an embodiment of this application further provides another communication method used on a network device side. The method also has a function of making a PHR sent by a terminal device better conform to an actual transmission status of the terminal device. Referring to FIG. 6, the method includes the following steps.

Step S601: A network device determines a first uplink data transmission moment and a first duration.

Step S602: If the network device sends a third control channel to the terminal device in a range of the first duration before the first uplink data transmission moment, the network device determines a type of PH based on a power headroom PH report sent by the terminal device.

Specifically, a specific implementation of step S601 may be consistent with the description in step S501. Details are not described herein again in this embodiment of this application.

In specific implementation of step S602, the network device may not learn of a PHR triggering moment of the terminal device, or the network device may still send the third control channel in the range of the first duration before the first uplink data transmission moment when learning of a PHR triggering moment of the terminal device. In this case, after receiving the PHR report sent by the terminal device, the network device may determine the type of the power headroom based on the power headroom report fed back by the terminal device.

As described above, in this embodiment of this application, the power headroom includes two types: real and virtual. If the terminal device indicates, by using the reported PHR, that a PH type on a CC is a virtual type, and the network device sends the third control channel on the CC in the range of the first duration before the first uplink data transmission moment, the network device may consider that the PH type that is on the CC and that is fed back by the terminal device is inaccurate, and may ignore the PH type that is on the CC and that is fed back by the terminal device, and determine that an actual PH type on the CC is a real type.

Figure 7:
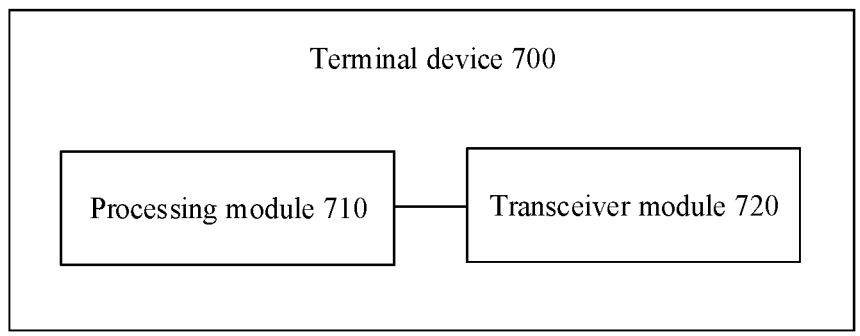
FIG. 7 is a schematic structural diagram of a terminal device according to an embodiment of this application.

An embodiment of this application further provides a terminal device. FIG. 7 is a schematic structural diagram of a terminal device according to an embodiment of this application. As shown in FIG. 7, the terminal device includes:

a processing module 710, configured to: determine a first uplink data transmission moment and a first duration; determine a first moment based on the first uplink data transmission moment and the first duration; and monitor a control channel based on the first moment; and a transceiver module 720, configured to send a power headroom report PHR based on the monitored control channel.

In a possible design, the first uplink data transmission moment includes a transmission moment of the first time of uplink data transmission performed by the terminal device after the PHR is triggered; and the first moment is a moment earlier than the first uplink data transmission moment and a duration between the first moment and the first uplink data transmission moment is the first duration.

In a possible design, the processing module 710 is specifically configured to use a third moment as the first uplink data transmission moment if a control channel is not detected through monitoring before a second moment after a first control channel is detected through monitoring, where a transmission moment of uplink data scheduled by using the control channel is before the third moment, the third moment is a transmission moment of uplink data scheduled by using the first control channel, and the second moment is a moment earlier than the third moment and a duration between the second moment and the third moment is the first duration.

In a possible design, the processing module 710 is further specifically configured to use a fourth moment as the first uplink data transmission moment if a second control channel is detected through monitoring before the second moment after the first control channel is detected through monitoring, where the fourth moment is a transmission moment of uplink data scheduled by using the second control channel, and the fourth moment is before the third moment.

In a possible design, the processing module 710 is further configured to reserve a triggered PHR event after the transceiver module 702 sends the PHR.

In a possible design, the PHR includes first indication information, and the first indication information is used to indicate whether the terminal device performs power borrowing.

It should be understood that the processing module 710 in this embodiment of the present disclosure may be implemented by a processor or a processor-related circuit component, and the transceiver module 720 may be implemented by a transceiver or a transceiver-related circuit component.

Figure 8:
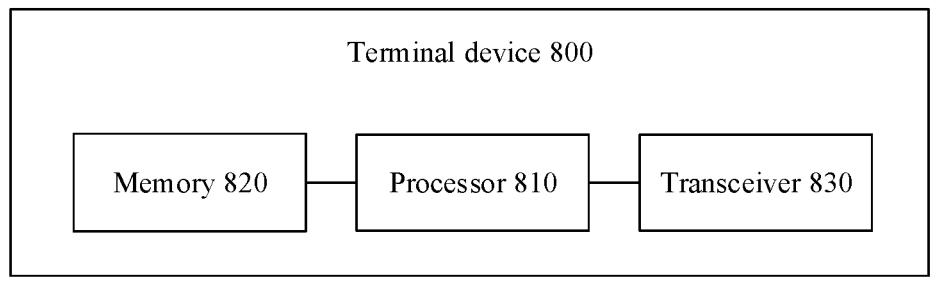
FIG. 8 is a schematic structural diagram of another communications device according to an embodiment of this application.

FIG. 8 is another schematic structural diagram of a terminal device according to an embodiment of this application. As shown in FIG. 8, the terminal device 800 includes a processor 810, a memory 820, and a transceiver 830. The memory 820 stores an instruction or a program. The processor 810 is configured to execute the instruction or the program stored in the memory 820. When the instruction or the program stored in the memory 820 is executed, the processor 810 is configured to perform an operation performed by the processing module 710 in the foregoing embodiment, and the transceiver 830 is configured to perform an operation performed by the transceiver module 720 in the foregoing embodiment.

It should be understood that the terminal device 700 or the terminal device 800 according to the embodiments of the present disclosure may correspond to the terminal device in S201 to S203 in the communication method in the embodiments of the present disclosure, and operations and/or functions of the modules in the terminal device 700 or the terminal device 800 are separately used to implement corresponding procedures of the methods in FIG. 2, FIG. 5, and FIG. 6. For brevity, details are not described herein again.

Figure 9:
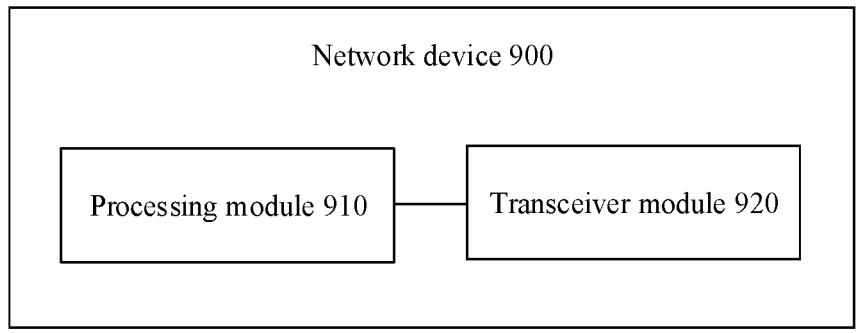
FIG. 9 is a schematic structural diagram of a network device according to an embodiment of this application.

Based on a same inventive concept, an embodiment of this application further provides a network device. FIG. 9 is a schematic structural diagram of a network device according to an embodiment of this application. As shown in FIG. 9, the network device includes a processing module 910 and a transceiver module 920.

In a possible design, the processing module 910 is configured to determine a first uplink data transmission moment and a first duration.

The transceiver module 920 is configured to skip sending a third control channel in a range of the first duration before the first uplink data transmission moment.

In another possible design, the processing module 910 is configured to determine a first uplink data transmission moment and a first duration.

The transceiver module 920 is configured to: if it is determined that a third control channel is sent to a terminal device by using the transceiver module in a range of the first duration before the first uplink data transmission moment, determine a type of PH based on a power headroom PH report sent by the terminal device.

It should be understood that the processing module 910 in this embodiment of the present disclosure may be implemented by a processor or a processor-related circuit component, and the transceiver module 920 may be implemented by a transceiver or a transceiver-related circuit component.

Figure 10:
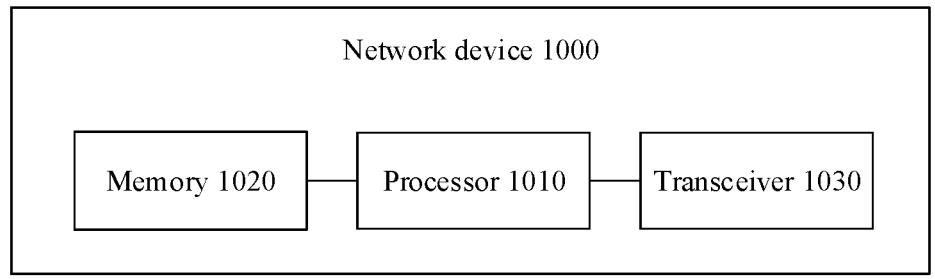
FIG. 10 is a schematic structural diagram of another network device according to an embodiment of this application.

FIG. 10 is another schematic structural diagram of a network device according to an embodiment of this application. As shown in FIG. 10, the network device 1000 includes a processor 1010, a memory 1020, and a transceiver 1030. The memory 1020 stores an instruction or a program. The processor 1010 is configured to execute the instruction or the program stored in the memory 1020. When the instruction or the program stored in the memory 1020 is executed, the processor 1010 is configured to perform an operation performed by the processing module 910 in the foregoing embodiment, and the transceiver 1030 is configured to perform an operation performed by the transceiver module 920 in the foregoing embodiment.

It should be understood that the network device 900 or the network device 1000 according to the embodiments of the present disclosure may correspond to the network device in S501 and S502 in the communication method in the embodiments of the present disclosure or the network device in S601 and S602 in the communication method, and operations and/or functions of the modules in the network device 900 or the network device 1000 are separately used to implement corresponding procedures of the method in FIG. 5 or FIG. 6. For brevity, details are not described herein again.

An embodiment of this application further provides a communications apparatus. The communications apparatus may be a terminal device, or may be a circuit. The communications apparatus may be configured to perform an action performed by the terminal device in the foregoing method embodiments.

Figure 11:
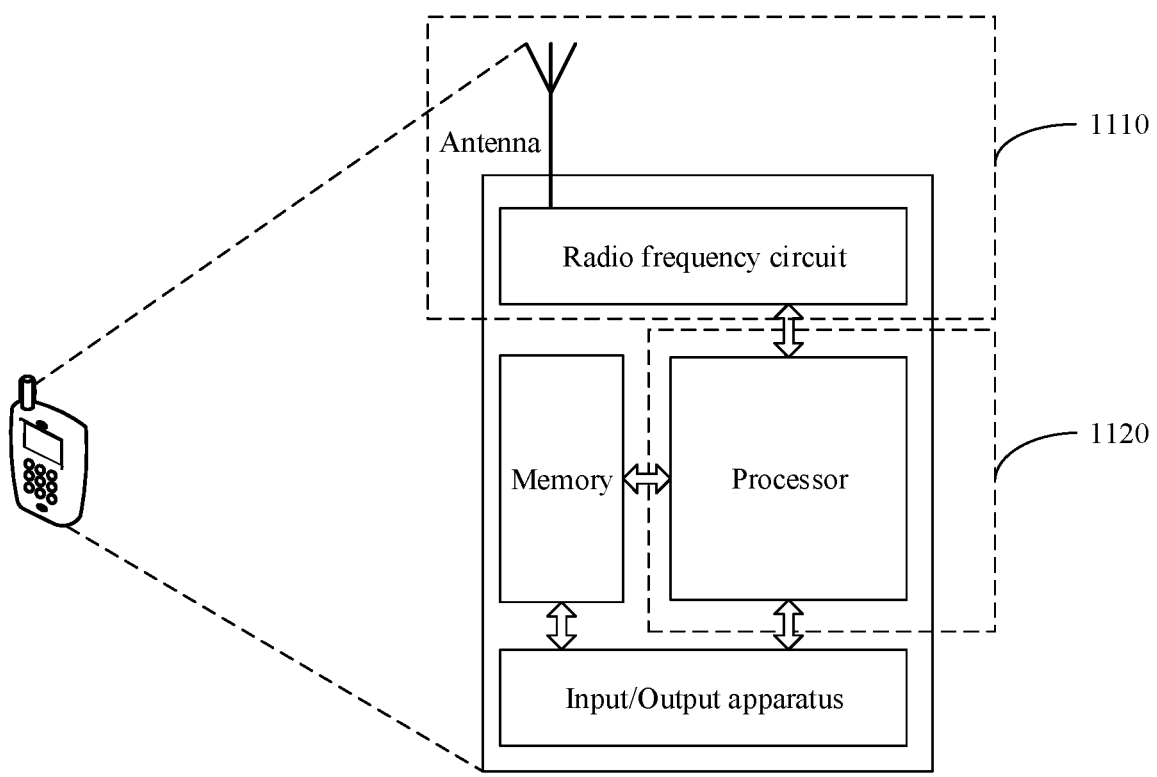
FIG. 11 is a schematic structural diagram of a communications apparatus according to an embodiment of this application.

When the communications apparatus is a terminal device, FIG. 11 is a simplified schematic structural diagram of the terminal device. For ease of understanding and illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus such as a touchscreen, a display, or a keyboard is mainly configured to: receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 11, the terminal device includes a transceiver unit 1110 and a processing unit 1120. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. That is, the transceiver unit 1110 includes the receiving unit and the sending unit. The transceiver unit may also be sometimes referred to as a transceiver, a transceiver, a transceiver circuit, or the like. The receiving unit may also be sometimes referred to as a receiver, a receiver, a receiving circuit, or the like. The sending unit sometimes may also be sometimes referred to as a transmitter, a transmitter, a transmitting circuit, or the like.

It should be understood that the transceiver unit 1110 is configured to perform the sending operation and the receiving operation on a terminal device side in the foregoing method embodiments, and the processing unit 1120 is configured to perform another operation excluding the receiving operation and the sending operation of the terminal device in the foregoing method embodiments.

For example, in an implementation, the transceiver unit 1110 is configured to perform the sending operation on the terminal device side in FIG. 2, and/or the transceiver unit 1110 is further configured to perform other receiving and sending steps on the terminal device side in the embodiments of this application. The processing unit 1120 is configured to perform step S201 in FIG. 2, and/or the processing unit 1120 is further configured to perform another processing step on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 12:
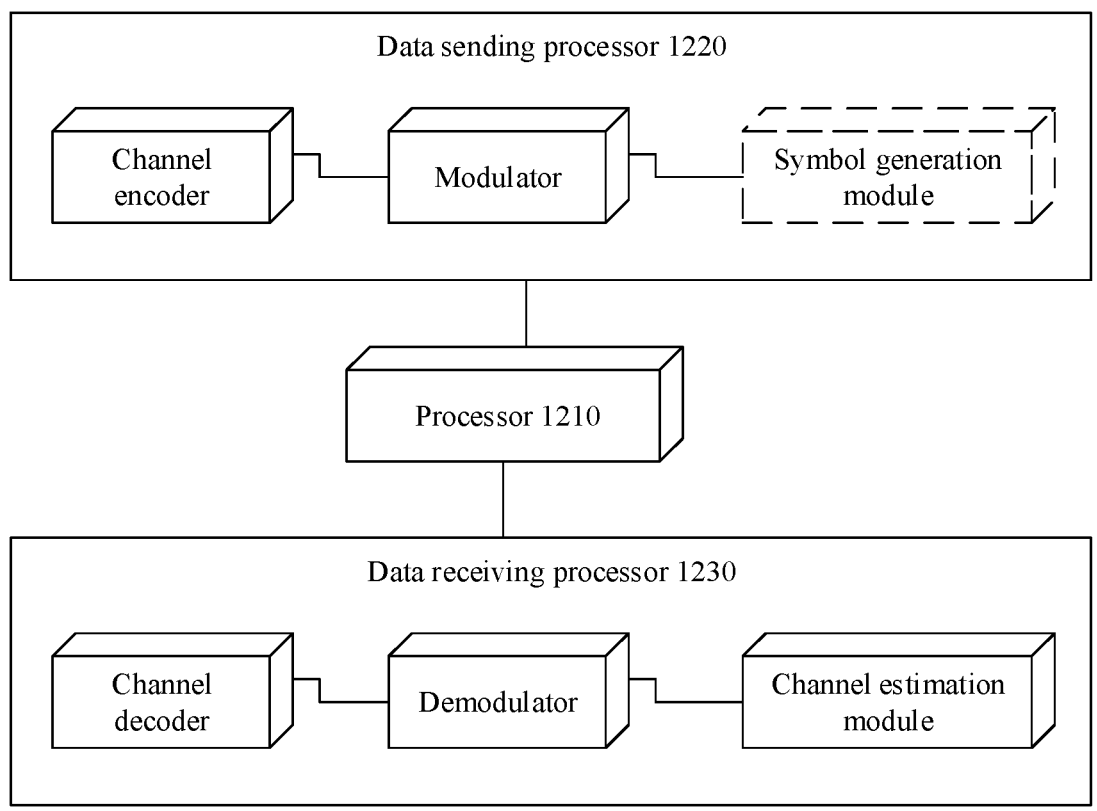
FIG. 12 is another schematic structural diagram of a communications apparatus according to an embodiment of this application.

When the communications apparatus in this embodiment is a terminal device, refer to a device shown in FIG. 12. In an example, the device may complete a function similar to that of the processor 810 in FIG. 8. In FIG. 12, the device includes a processor 1210, a data sending processor 1220, and a data receiving processor 1230. The processing module 710 in the foregoing embodiment may be the processor 1210 in FIG. 12, and implements a corresponding function. The transceiver module 720 in the foregoing embodiment may be the data sending processor 1220 and/or the data receiving processor 1230 in FIG. 12. Although FIG. 12 shows a channel encoder and a channel decoder, it may be understood that the modules are merely examples, and do not constitute a limitation on this embodiment.

Figure 13:
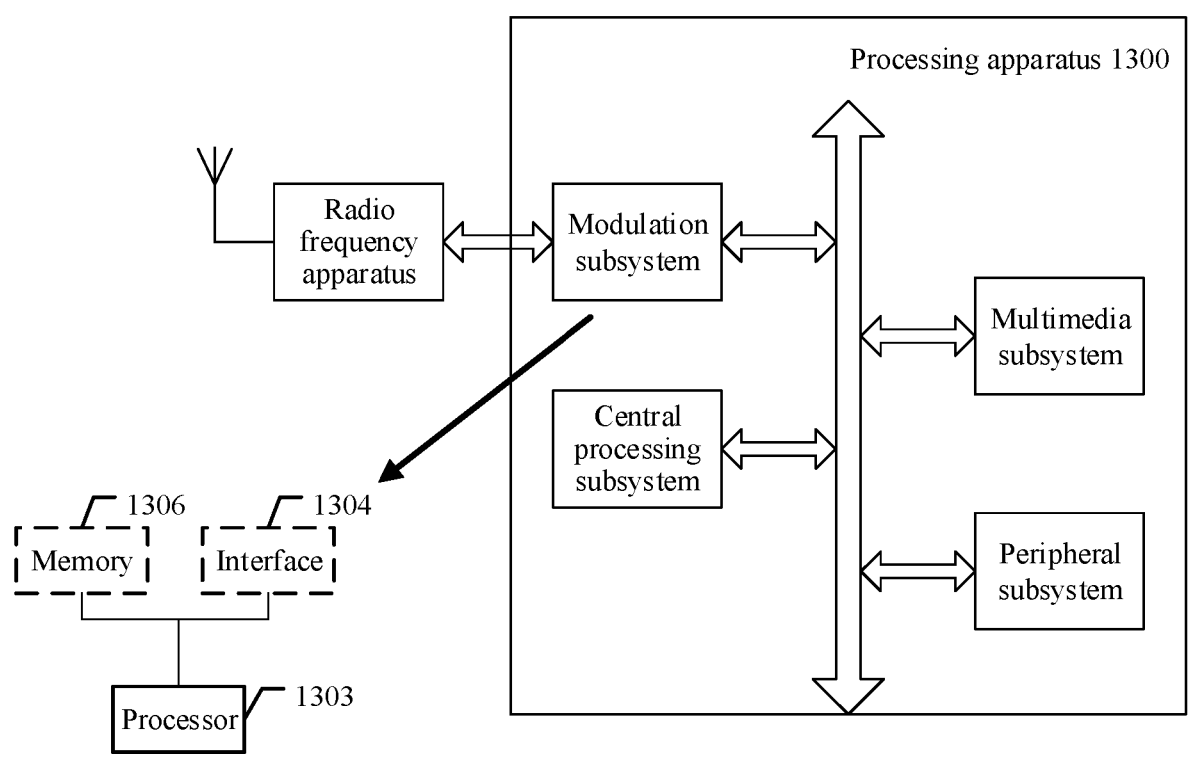
FIG. 13 is still another schematic structural diagram of a communications apparatus according to an embodiment of this application.

FIG. 13 shows another form of this embodiment. A processing apparatus 1300 includes modules such as a modulation subsystem, a central processing subsystem, and a peripheral subsystem. The communications apparatus in this embodiment may be used as the modulation subsystem in the processing apparatus 1300. Specifically, the modulation subsystem may include a processor 1303 and an interface 1304. The processor 1303 implements a function of the processing module 710, and the interface 1304 implements a function of the transceiver module 720. In another variation, the modulation subsystem includes a memory 1306, a processor 1303, and a program that is stored in the memory 1306 and that can be run on the processor. When executing the program, the processor 1303 implements the method on the terminal device side in the foregoing method embodiments. It should be noted that the memory 1306 may be a non-volatile memory, or may be a volatile memory. The memory 1306 may be located in the modulation subsystem, or may be located in the processing apparatus 1300, provided that the memory 1306 can be connected to the processor 1303.

In another form of this embodiment, a computer-readable storage medium is provided. The computer-readable storage medium stores an instruction. When the instruction is executed, the method on the terminal device side in the foregoing method embodiments is performed.

In another form of this embodiment, a computer program product that includes an instruction is provided. When the instruction is executed, the method on the terminal device side in the foregoing method embodiments is performed.

An embodiment of this application further provides a computer-readable storage medium. The computer storage medium stores a computer-readable instruction. When the computer-readable instruction is read and executed on a computer, the computer is enabled to perform the method on the network device side in any one of the foregoing method embodiments.

An embodiment of this application provides a computer program product. When the computer program product is read and executed on a computer, the computer is enabled to perform the method on the network device side in any one of the foregoing method embodiments.

An embodiment of this application provides a chip. The chip is connected to a memory, and is configured to read and execute a software program stored in the memory, to implement the method on the terminal device side in any one of the foregoing method embodiments.

An embodiment of this application provides a chip. The chip is connected to a memory, and is configured to read and execute a software program stored in the memory, to implement the method on the network device side in any one of the foregoing method embodiments.

An embodiment of this application provides a communications system. The system includes a terminal device and a network device. The terminal device may be configured to perform the method on the terminal device side in any one of the foregoing method embodiments, and the network device may be configured to perform the method on the network device side in any one of the foregoing method embodiments.

It should be understood that, the processor mentioned in the embodiments of this application may be a central processing unit (CPU), or may be another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It may be further understood that the memory mentioned in the embodiments of this application may be a volatile memory or a non-volatile memory, or may include a volatile memory and a non-volatile memory. The non-volatile memory may be a read-only memory (ROM), a programmable read-only memory (programmable ROM, or PROM), an erasable programmable read-only memory (erasable PROM, or EPROM), an electrically erasable programmable read-only memory (electrically EPROM, or EEPROM), or a flash memory. The volatile memory may be a random access memory (RAM), used as an external cache. Through example but not limitative description, many forms of RAMs may be used, for example, a static random access memory (static RAM, or SRAM), a dynamic random access memory (dynamic RAM, or DRAM), a synchronous dynamic random access memory (synchronous DRAM, or SDRAM), a double data rate synchronous dynamic random access memory (double data rate SDRAM, or DDR SDRAM), an enhanced synchronous dynamic random access memory (enhanced SDRAM, or ESDRAM), a synchlink dynamic random access memory (synchlink DRAM, or SLDRAM), and a direct rambus random access memory (direct rambus RAM, or DR RAM).

It should be noted that when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be further understood that "first", "second", "third", "fourth", and various numbers in this specification are merely used for differentiation for ease of description, and are not construed as a limitation to the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a device, a first uplink data transmission moment based on detecting a first control channel through monitoring on a first component carrier;
   determining, by the device, a first duration;
   determining, by the device, a first moment based on the first uplink data transmission moment and the first duration, wherein the first moment is determined by subtracting the first duration from the first uplink data transmission moment, wherein the first duration is a longest duration in a plurality of second durations, and wherein one second duration in the plurality of second durations corresponds to one subcarrier spacing;
   detecting, by the device, a second control channel through monitoring on a second component carrier before the first moment;
   updating, by the device, the first uplink data transmission moment to an updated first uplink data transmission moment based on detecting the second control channel;
   updating, by the device, the first moment to an updated first moment based on the updated first uplink data transmission moment and the first duration, wherein the updated first moment is determined by subtracting the first duration from the updated first uplink data transmission moment:
   calculating, by the device, a power headroom (PH) value, wherein the PH value is calculated based on actual transmission based on the second control channel being detected through monitoring before the first moment; and
   sending, by the device, a power headroom report (PHR) based on the PH value.

2. The method according to claim 1,
   wherein the first moment is a moment earlier than the first uplink data transmission moment; and
   wherein a duration between the first moment and the first uplink data transmission moment is the first duration.

3. The method according to claim 1, wherein the method further comprises:
   sending, by the device, the PHR at the first uplink data transmission moment.

4. The method according to claim 2, wherein the first uplink data transmission moment comprises a transmission moment of a first time of uplink data transmission that is after the PHR is triggered.

5. The method according to claim 1, wherein data transmission performed at the first uplink data transmission moment comprises new data transmission scheduled by a network device or data transmission semi-statically configured by the network device.

6. The method according to claim 1, wherein the PHR comprises the PH value or a PH type.

7. The method according to claim 6, wherein the PH type is real or virtual.

8. A communication method, comprising:
   determining, by a device, a first uplink data transmission moment based on detecting a first control channel through monitoring on a first component carrier;
   determining, by the device, a first duration;
   determining, by the device, a first moment based on the first uplink data transmission moment and the first duration, wherein the first moment is determined by subtracting the first duration from the first uplink data transmission moment, wherein the first duration is a longest duration in a plurality of second durations, and wherein one second duration in the plurality of second durations corresponds to one subcarrier spacing;

detecting, by the device, a second control channel through monitoring on a second component carrier before the first moment;
updating, by the device, the first uplink data transmission moment to an updated first uplink data transmission moment based on detecting the second control channel;
updating, by the device, the first moment to an updated first moment based on the updated first uplink data transmission moment and the first duration, wherein the updated first moment is determined by subtracting the first duration from the updated first uplink data transmission moment; and
receiving, by the device, a power headroom report (PHR) based on a power headroom (PH) value, wherein the PH value is calculated based on actual transmission based on the second control channel being detected through monitoring before the first moment.

9. The method according to claim 8, wherein the PHR comprises the PH value or a PH type.

10. The method according to claim 9, wherein the PH type is real or virtual.

11. A communications apparatus, comprising:
at least one memory; and
at least one processor, wherein the at least one processor is coupled to the at least one memory, and the at least one processor is configured to execute a computer program or an instruction stored in the at least one memory, so that the apparatus performs operations of:
determining a first uplink data transmission moment based on detecting a first control channel through monitoring on a first component carrier;
determining a first duration;
determining a first moment based on the first uplink data transmission moment and the first duration, wherein the first moment is determined by subtracting the first duration from the first uplink data transmission moment, wherein the first duration is a longest duration in a plurality of second durations, and wherein one second duration in the plurality of second durations corresponds to one subcarrier spacing;
detecting a second control channel through monitoring on a second component carrier before the first moment;
updating the first uplink data transmission moment to an updated first uplink data transmission moment based on detecting the second control channel;
updating the first moment to an updated first moment based on the updated first uplink data transmission moment and the first duration, wherein the updated first moment is determined by subtracting the first duration from the updated first uplink data transmission moment;
calculating a power headroom (PH) value, wherein the PH value is calculated based on actual transmission based on the second control channel being detected through monitoring before the first moment; and
sending a power headroom report (PHR) based on the PH value.

12. The communications apparatus according to claim 11, wherein the first moment is a moment earlier than the first uplink data transmission moment; and
wherein a duration between the first moment and the first uplink data transmission moment is the first duration.

13. The communications apparatus according to claim 11, wherein the operations further comprise:
sending the PHR at the first uplink data transmission moment.

14. The communications apparatus according to claim 12, wherein the first uplink data transmission moment comprises a transmission moment of a first time of uplink data transmission that is after the PHR is triggered.

15. The communications apparatus according to claim 11, wherein data transmission performed at the first uplink data transmission moment comprises new data transmission scheduled by a network device or data transmission semi-statically configured by the network device.

* * * * *

UNITED STATES PATENT AND TRADEMARK OFFICE
CERTIFICATE OF CORRECTION

PATENT NO. : 12,284,614 B2
APPLICATION NO. : 17/171826
DATED : April 22, 2025
INVENTOR(S) : Zhang et al.

It is certified that error appears in the above-identified patent and that said Letters Patent is hereby corrected as shown below:

In the Claims

Claim 1: Column 22, Line 25: "mission moment:" should read as -- mission moment; --.

Claim 11: Column 23, Line 31: "monitoring on a first component carrier:" should read as -- monitoring on a first component carrier; --.

Signed and Sealed this
Twenty-first Day of October, 2025

John A. Squires
*Director of the United States Patent and Trademark Office*